United States Patent

[11] 3,557,663

| [72] | Inventor | Peter Florjancic |
| | | St. Martin Strasse 12 |
| | | Garmisch-Partenkirchen, Germany |
| [21] | Appl. No. | 748,267 |
| [22] | Filed | July 29, 1968 |
| [45] | Patented | Jan. 26, 1971 |
| [32] | Priorities | Aug. 3, 1967 |
| [33] | | Austria |
| [31] | | A7236/67; |
| | | Sept. 29, 1967, Germany, No. F53628 |

[54] HYDRAULIC DRIVE SYSTEM FOR INJECTION MOLDING MACHINES
15 Claims, 9 Drawing Figs.

[52] U.S. Cl. .................................................. 91/394,
 91/405, 91/416, 18/30
[51] Int. Cl. ..................................................... F15b 15/22,
 F15b 15/17
[50] Field of Search .......................................... 91/394,
 404, 405(Cursory), 416(Cursory); 18/30(LA), 30(LV)

[56] References Cited
UNITED STATES PATENTS

| 2,805,447 | 9/1957 | Voges .......................... | 91/404 |
| 2,853,974 | 9/1958 | Hewitt .......................... | 91/394 |
| 3,010,432 | 11/1961 | Robra et al. ................. | 91/417 |

Primary Examiner—Paul E. Maslousky
Attorney—Fleit, Gipple & Jacobson

ABSTRACT: A device is provided for increasing the thrust force applied to a displaceable part at the end of its stroke. The part to be moved is connected by at least one push rod to a working piston, which is movable in a pressure chamber substantially without contacting the boundaries of said chamber. The piston is provided at one end with an annular sealing surface for engaging a valve piston, which is displaceable in the direction of the stroke of the working piston and is sealed at its periphery. The body of said valve piston has a bore between its rear end and its forward end, which is surrounded by the valve seat and faces the working piston. The chamber which adjoins the rear end is connected by a preferably valved outlet to a chamber which is under a pressure that is lower than the operating pressure.

3,557,663

HYDRAULIC DRIVE SYSTEM FOR INJECTION MOLDING MACHINES

This invention relates to a hydraulic drive system, preferably a closing apparatus for injection molding machines, which system comprises a device for increasing the thrust force applied to a displaceable part at the end of its stroke. In such drive system, a motive liquid which has been raised to a high pressure by one or more pumps acts on one or more pistons, which are connected to the displaceable part, e.g., to the closing plate which carries one half of an injection mold. When the mold is to be closed, that mold half must be moved first at a speed which is as high as possible and only frictional resistances are to be overcome during this phase. When the displaceable mold half has engaged the second mold half and has come substantially to a standstill, a high closing pressure is required.

To provide for such a sequence of operations, it is known to provide two cylinders which differ in diameter and have corresponding pistons. Liquid is supplied to the piston which is small in diameter when the mold is to be closed, whereas liquid is subsequently supplied to the piston which is large in diameter when the mold halves are to be forced against one another.

This arrangement has various disadvantages. Two pumps are required, or a changeover device. In addition, the large cylinder must be supplied with oil at a relatively high rate during the closing operation and therefore the conduits used for this purpose must be large in diameter in order to reduce the resistance to flow and must also have a large wall thickness owing to the high pressure. A special disadvantage resides in that the piston which is large in diameter must be in snug sealing contact with the cylinder wall. This requires a careful, expensive machining of the cylinder wall and involves a considerable loss due to friction during the closing operation. This loss due to friction must be considered when dimensioning the closing cylinder. Further, disturbances in function due to wear or relatively large particles of foreign matter cannot be entirely avoided. Finally, the two cylinders are coaxial and disposed in line; this arrangement has an undesired effect on the size and weight of the closing apparatus.

The closing apparatus according to the invention avoids said disadvantages in that the part to be moved is connected by at least one pushrod to a working piston, which is movable in a pressure chamber substantially without contacting the boundaries of said chamber, said piston is provided at one end with an annular sealing surface for engaging a valve piston, which is displaceable in the direction of the stroke of the working piston and is sealed at its periphery, the body of said valve piston has a bore between its rear end and its forward end, which is surrounded by the valve seat and faces the working piston, and the chamber which adjoins the rear end is connected by a preferably valved outlet to a chamber which is under a pressure that is lower than the operating pressure.

Hence, there is only a single working piston and the same is not guided at its periphery in a cylinder but moves in a pressure chamber without contacting the boundaries thereof so that there is no need for any machining of the periphery of the piston and of the boundary surface of the pressure chamber. As a result, there is no piston friction, and disturbances are precluded, the piston and pressure chamber may be manufactured independently of each other in any desired cross-sectional shapes and at low cost.

As the valve piston performs only a short stroke while the mold halves are forced one against the other, the sealing surfaces have a relatively small axial length so that their machining is inexpensive and their wear and friction is low.

When the pressure chamber is shut off at the end of the closing operation, high dynamic pressures are generated, which effect a gentle braking of the moving masses even when heavy molds are fixed to the closing plate.

The present invention will become better understood when reference is made to the following disclosure taken in conjunction with the accompanying drawings.

Figure 1:
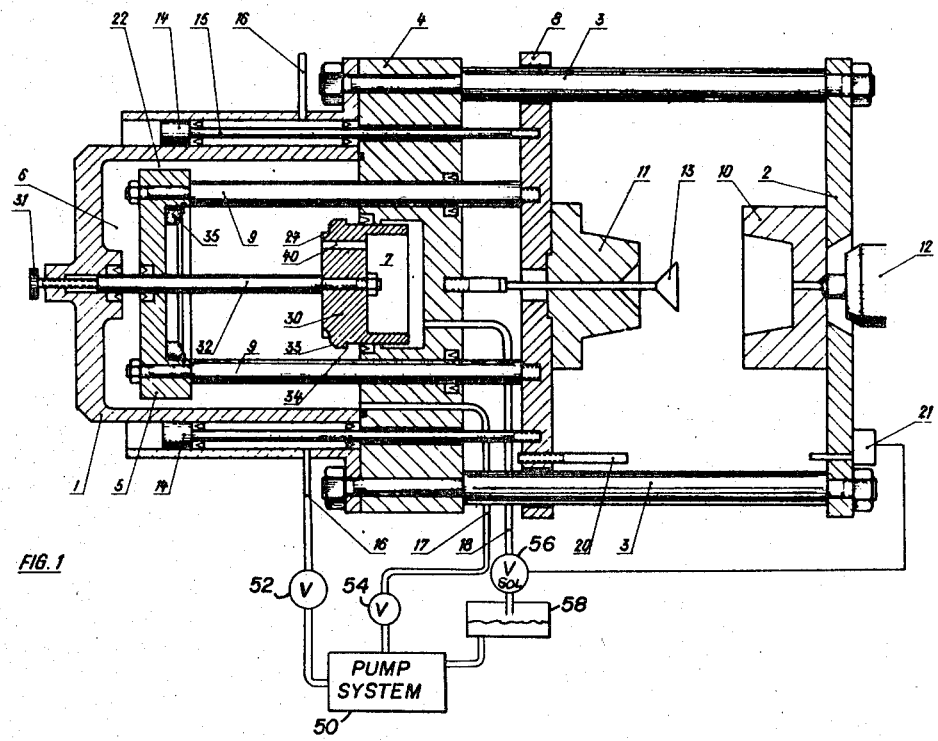
FIGS. 1 and 2 show a first embodiment of the present invention.
Figure 2:
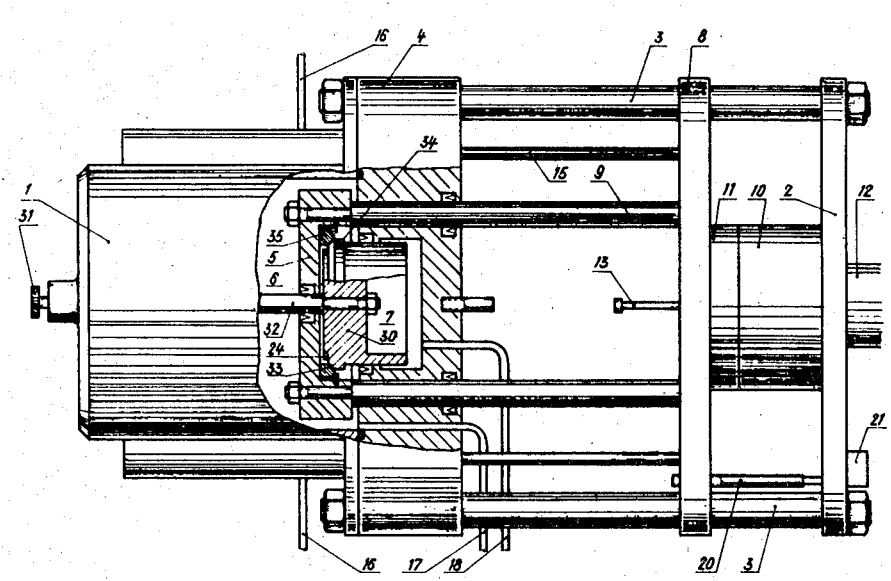

In FIGS. 1 and 2, a bell-shaped wall 1 together with a cover 4 enclose a pressure chamber 6. The cover 4 and wall 1 are connected by studs 3 to one another and to a fixing plate 2.

A piston 5 is supported in the pressure chamber 6 and is spaced from the boundary wall 1 of the pressure chamber by a clearance 22. The piston 5 is connected to a closing plate 8 by two push rods 9, which are guided in and sealed through the cover 4.

The two parts 10 and 11 of an injection mold are supported by the fixing plate 2 and the closing plate 8, respectively. an injection head is indicated at 12 and an ejector at 13.

Two cylinders which are smaller in diameter and accommodate the pullback pistons 14 are disposed laterally of the pressure chamber 6. The pullback pistons are firmly connected by piston rods 15 to the closing plate 8. The lateral arrangement of the pullback pistons 14 results in a short overall axial length and a light weight of the entire drive system.

In a bore of the cover 4, a valve piston 30 is longitudinally slidably mounted and sealed in such a manner that the rear end of the piston 30 is adjoined by a chamber 7. The valve piston 30 is provided on its forward end with a conical seat 33, which cooperates with a mating sealing ring 35 provided in the working piston 5. Milled recesses 24 are formed on the periphery within the valve seat 33.

The pressure chamber 6 is connected by a pipeline 17 to a pump system 50 and each pullback cylinder is connected to the pump system by a pipeline 16. Each of the pipelines 16 and 17 includes a valve 52 and 54, respectively. The chamber 7 is connected by the outlet 18 and a valve 56 to the nonpressurized supply container 58 of the pump reservoir. The last-mentioned valve is, e.g., a solenoid valve, which is opened by the limit switch 21 as soon as the adjustable actuating pin 20 strikes on the limit switch 21.

An engaging pin 32 which is firmly connected to the valve piston 30 is sealed through the working piston 5 and the bell-shaped wall 1 of the pressure chamber 6. An adjusting screw 31 limits the movement of the valve piston 30 toward the working piston 5.

The engaging pin 32 is displaceable in a bore through the wall 1. The adjusting screw 31 which can be rotated externally of the wall 1 extends through the bore with its free end forming a stop for the adjacent end surface of the pin 32. In this way the engaging pin 32 and thus the valve piston 30 are held against movement towards the working piston in excess of that movement permitted by the adjusting screw 31. On the other hand, however, the stop pin 32 with the associated valve piston 30 are free to move away from the adjusting screw 31, as shown, for example, in FIG. 5. By rotating the adjusting screw 31, the time of contact between the working piston 5 and the valve piston 30 can be varied.

The apparatus has the following mode of operation:

When it is assumed that the elements are initially in the position shown in FIG. 1, liquid under pressure is supplied through the pipeline connection 17 into the pressure chamber 6 to move the working piston 5 toward the closed position under a force which is equal to the product of the operating pressure and the cross-sectional area of the pushrods 9. This force is sufficient to overcome the small frictional resistances of the pushrods 9 and other guides. On the other hand, the rate at which oil must be supplied is small and equals the product of the cross-sectional area of the pushrods 9 and the displacement. The main flow of the pressure liquid takes place in the pressure chamber 6 itself from one end of the working piston 5 to the other through the annular gap 22, which may be so large that an excessive resistance to flow in this gap is precluded. It is sufficient to dimension the conduit 17 for a small flow rate.

During this forward movement of the working piston 5, the stop pin 32 applies to the adjusting screw 31 a force which is equal to the product of the cross-sectional area of the stop pin 32 and the operating pressure.

When the sealing ring 35 carried in the working piston 5 approaches the valve piston 30, the decreasing cross sections of flow in the milled recesses 24 and the dynamic pressure which is built up when the pressure chamber 6 is shut off ensure a fast and yet gentle braking of the moving masses.

Liquid under pressure is present between the adjacent surface of the working piston 5 and the valve piston 30 at all times during the movement of the working piston toward the valve piston. Naturally, as the relative distance between these two pistons decreases, there must be a displacement of the liquid therebetween. However, just before the adjacent faces of the pistons come into physical contact, the liquid displacement can take place only through the milled recesses 24. As a consequence there is a throttling action experienced by the moving masses—for a brief period of time, a relatively high pressure appears between the adjacent faces of the two pistons and prevents large impact between these pistons.

When the fixing plate 8 has almost reached the closed position (FIG. 2), the outlet 18 is opened by the limit switch 21 under the control of the actuating pin 20. As a result, the chamber 7 and, owing to the bore 40, the chamber between the forward end of the valve piston 30 and the working piston 5 are pressure-relieved. The working piston is now urged in the closing direction with a force which is equal to the product of the cross-sectional area that is surrounded by the valve seal and of the operating pressure.

The adjusting screw 31 may be adjusted to ensure that the working piston 5 engages the valve piston 30 before the two mold halves 10 and 11 contact each other. In this case, the working piston 5 and the valve 30 will move in unison when the outlet 18 has been opened but the distance which is travelled by the two pistons in unison is relatively small so that the wear of the sealing surfaces is small too.

The shoulder 34 at the periphery of the valve piston 30 has an axially facing surface which is subjected to the pressure of the working liquid so that a force is produced which acts in the direction in which the valve piston 30 is closed. In the space between the seating faces of the valve, there is a pressure acting in the direction in which the valve piston 30 is opened. As this pressure decreased inwardly, there is a net force acting in the closing direction to prevent a lifting of the valve. This closing force may be produced in a different manner, e.g., by separate pressure pistons, to which the liquid under pressure is admitted and which act on the valve piston 30. Alternatively, the stop pin 32 may be larger in diameter at its free end, where it extends through the wall 1 that defines the pressure chamber 6, than in the remaining portion of its length, where it extends through the working piston 5. A spring may also be used in known manner to force the valve piston 30 against the sealing ring 35, e.g., if the stop pin 32 does not extend out of the pressure chamber 6 but the stop is disposed within the pressure chamber 6.

The above-mentioned solenoid valve may be replaced by a simple relief valve or by a construction and the bore 40 may be designed to form such constriction. In this case, a limit switch is not required and the structure is greatly simplified. In one case, oil at a very low rate will be exhausted through the relief valve only in the last phase of the closing operation. In the second case, there will be a loss of oil throughout the closing operation but this loss can be kept within tolerable limits because the pressure in the pressure chamber 6 is only moderate during that time.

Figure 3:
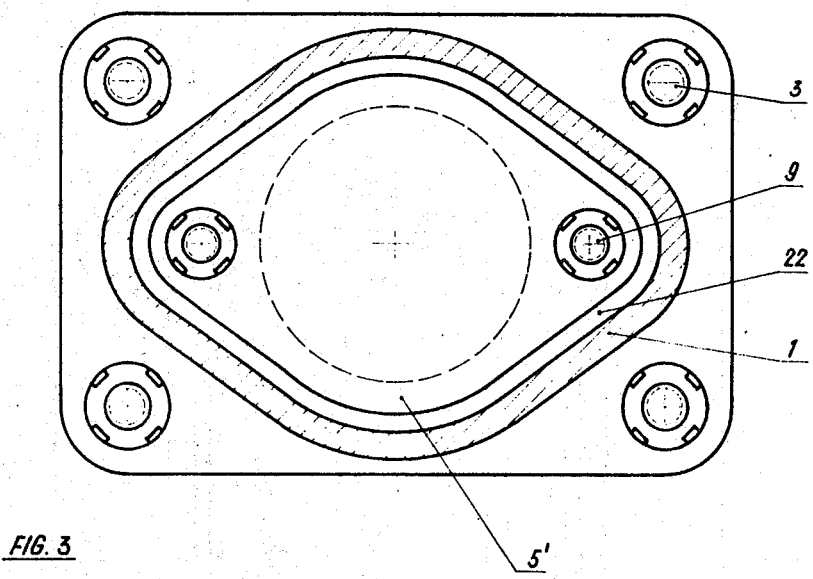
FIGS. 3 and 4 show two alternate arrangements for the working piston of the present invention.
Figure 4:
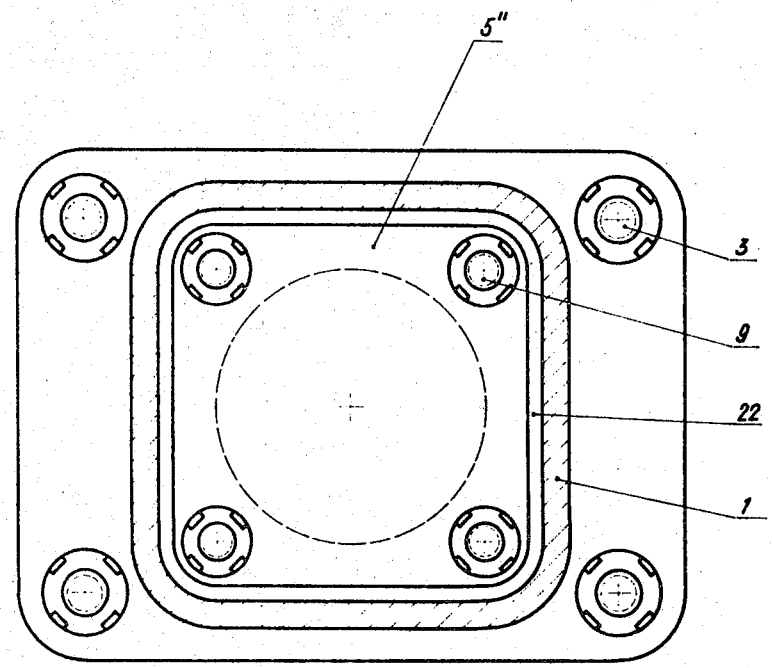

As is apparent from FIGS. 3 and 4, the pressure chamber 6 and the working piston 5 need not be circular in cross section but may have any desired cross-sectional configuration. The diamond-shaped cross section shown in FIG. 3 at 5′ is particularly desirable where two pushrods 9 are employed. The square configuration represented in FIG. 4 at 5″ is particularly desirable where four pushrods 9 are employed. The working piston 5 and the pressure chamber 6 may differ in cross-sectional configuration when this is desirable for design reasons.

Figure 5:
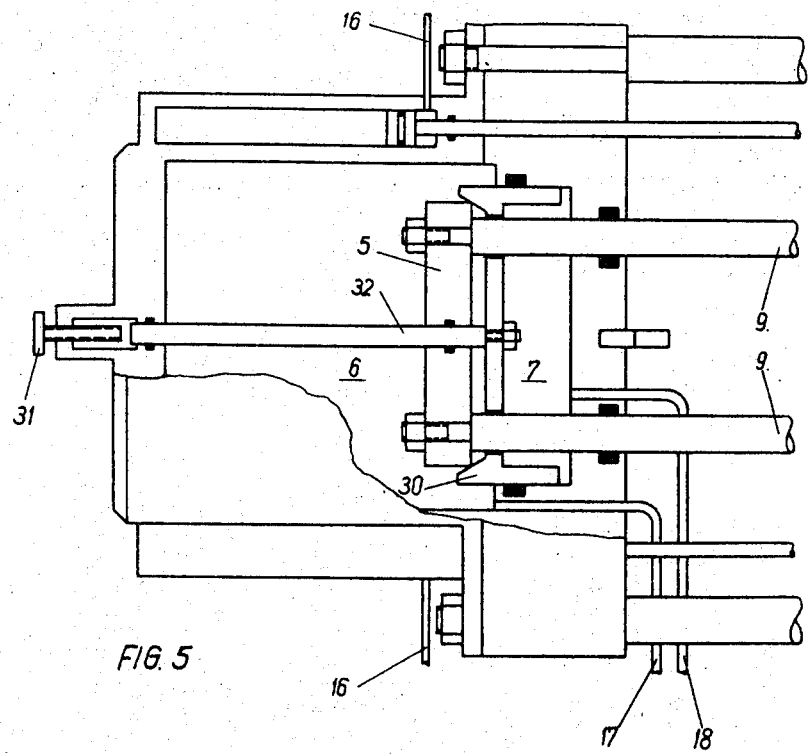
FIGS. 5 and 6 show two further, but similar, embodiments of the present invention.
Figure 6:
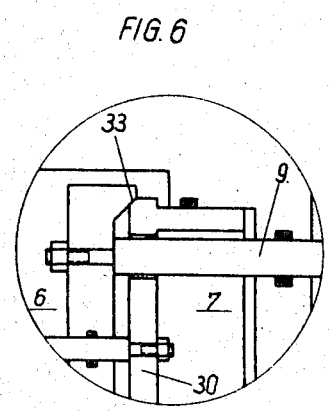

FIGS. 5 and 6 show two embodiments of a hydraulic drive system according to the invention where the pushrods 9 are disposed on a diameter which is smaller than that of the valve seal 35. This arrangement enables the use of a valve seat which is larger in diameter so that a larger closing force can be produced for a given operating pressure. Instead of a sealing ring 35 inserted in the working piston 5, the latter itself is formed with the surface which mates and cooperates with the valve seat 33. The seat 33 on the valve piston 30 consists of an internal cone in the embodiment of FIG. 5 and of an external cone in the embodiment of FIG. 6.

Although the hydraulic drive system according to the invention has been described by way of example with reference to parts moving along a straight line, the system may be analogously used with displaceable parts which move along paths which are circularly or differently curved. It is intended to include such drive systems in the scope of protection.

Further improvements of the hydraulic drive system according to the invention will be explained by way of example in the embodiments shown in FIGS. 7 to 9.

Figure 7:
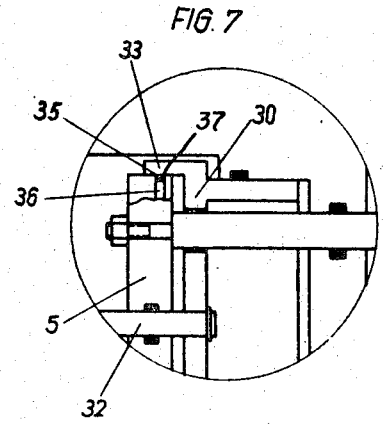
FIGS. 7 through 9 show still a further embodiment of the invention.

FIG. 7 shows an improvement over the embodiment shown in FIG. 6. The working piston 5 is formed with an annular groove 36, in which a sealing ring 37 is mounted, which consists of compressible material. The valve piston 30 is mounted on the stop pin 32 for a limited axial movement and is provided with a sleeve-shaped valve seat 33′. This design of the drive system according to the invention affords the advantage that the sleevelike valve seat 33′ of the valve piston 30 slides quickly onto the compressible sealing ring 37 on the working piston when the latter has moved its sealing ring as far as to the outer rim of the sleevelike valve seat 33′. As a result, the seal is quickly established so that the cycle of operation of the drive system is shortened.

Figure 8:
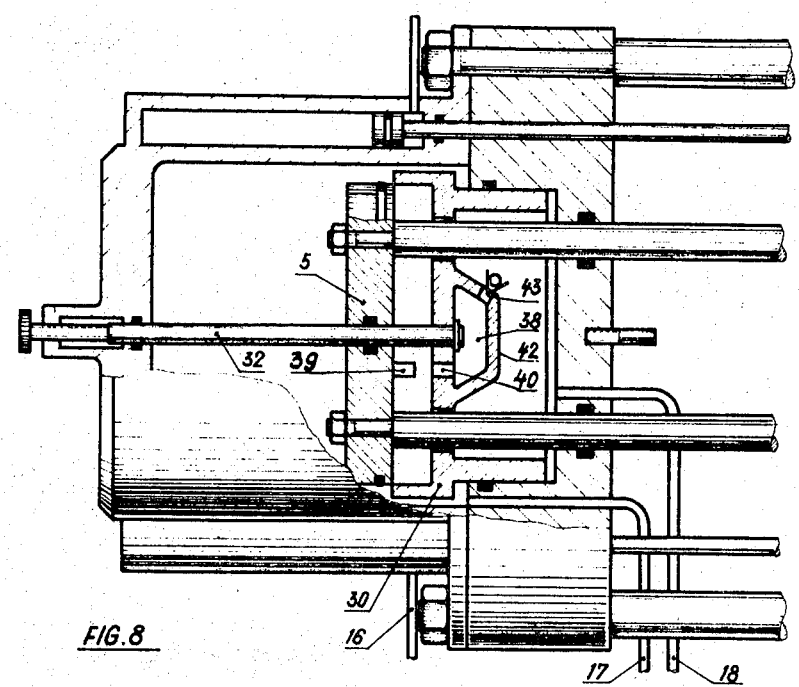
Figure 9:
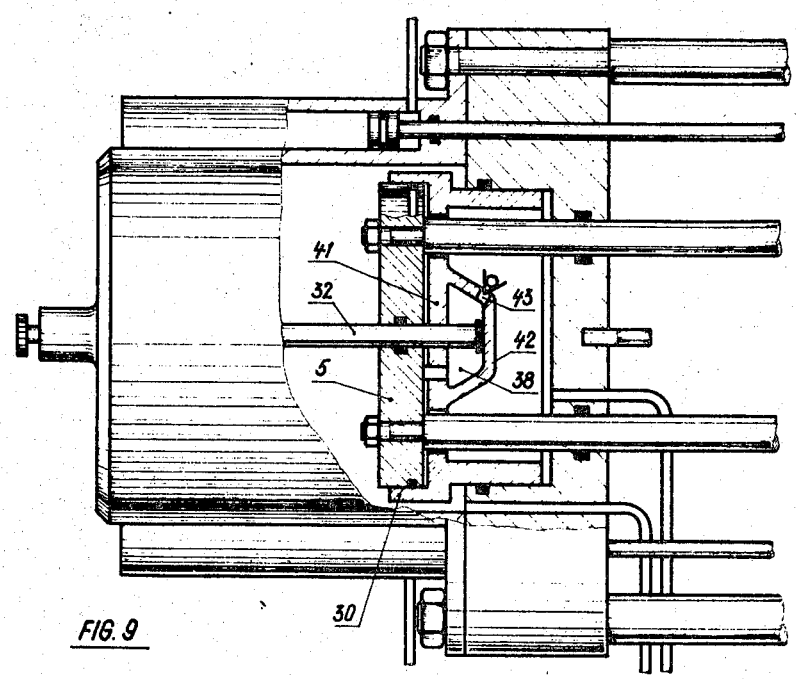

The additional embodiment of the invention shown in FIGS. 8 and 9 clearly indicates the two operations which have just been described. Besides, this embodiment includes an additional feature of the invention. The valve piston 30 comprises a bell-shaped hydraulic chamber 38, into which the sealed stop pin 32 extends. As is apparent from FIG. 9, the axial movement of the valve piston 30 on the stop pin 32 is limited by the latter in this arrangement. The stop pin 32 is sealed through a straight wall 41 of the hydraulic chamber 38. The wall 41 is formed with an additional bore 40, which may accommodate a valve pin 39 (see FIG. 9), which is secured to the working piston 5. An outlet opening 43 is formed in the bell-shaped opposite wall 42 of the hydraulic chamber 38 and is provided with a check valve. This feature of the drive system according to the invention increases the advantage which has been explained with reference to FIG. 7. Where the bell-shaped hydraulic chamber 38 is provided, the area acted upon by the hydraulic liquid during the opening movement of the two mold halves is larger than the area acted upon by the hydraulic liquid to separate the working piston from the sleevelike valve seat of the valve piston because the hydraulic liquid can apply an opening force also adjacent to the stop pin 32. A large force is thus produced and slowly moves the mold halves apart until the stop pin 32 engages the inside of the bell-shaped wall 42 and the separation between the working piston 5 and the valve piston 30 is then initiated. Before that time, a power stroke is enabled also in the opening direction because the compensating chamber becomes a working chamber in the region in which the valve piston 30 provided with a hydraulic chamber 38 is axially displaceable on the stop pin 32.

I claim:

1. A hydraulic drive system, particularly a closing device for an injection molding machine, the system comprising: a pressure chamber having walls closed by a cover; a pump system for feeding hydraulic fluid at the first pressure to said pressure chamber; a working piston movable in said pressure chamber without physical contact between the piston and the walls of said pressure chamber; a displacement member connected to said working piston by at least one pushrod, the pushrod passing through said cover; a valve piston displaceable in the working direction of the working piston and guided with its circumferential surface in sealed fashion in a valve space of the cover, said valve piston having at least one opening passing therethrough for connecting said pressure chamber with said valve space; a supply container for housing hydraulic fluid at a second pressure lower than said first pressure; sealing means on the respective facing surfaces of the working piston and the valve piston for closing said opening in the valve piston; and means for connecting said supply container to said valve space, the working piston and the valve piston thereby being acted on by the second pressure.

2. A hydraulic drive system in accordance with claim 1, wherein said sealing means comprises a sealing ring arranged on the surface of the working piston facing the valve piston and a valve seat arranged on the surface of the valve piston facing the working piston.

3. A hydraulic drive system, according to claim 1, in which the valve piston is displaceably connected with a wall opposite said cover by means of a stop pin passing, in a sliding and sealed fashion, through the working piston.

4. A hydraulic drive system, according to claim 3, in which the valve piston contains a hydraulic chamber extending into the valve space; further comprising a stop pin extending, in a sealed fashion, through the end surface of the valve piston; a first passage opening in said valve piston defining a communication between said hydraulic chamber and the pressure space; and a second passage opening in said valve piston defining a communication between the hydraulic chamber and the valve space.

5. A hydraulic drive system, according to claim 4, and further comprising a nonreturn valve for closing the second passage opening in the hydraulic chamber against the return flow of hydraulic fluid from the valve space into the hydraulic chamber.

6. A hydraulic drive system, according to claim 3, in which the working piston is connected with the displacement member by means of two pushrods passed through openings in the end surface of the valve piston.

7. A hydraulic drive system, according to claim 6, in which the openings in the end surface of the valve piston are substantially larger in cross section than are the pushrods and therefore simultaneously serve as passage openings for connecting the valve space with the pressure space.

8. A hydraulic drive system, according to claim 1, in which, when the sealing means at the respective surfaces of the working piston and the valve piston rest in sealed manner against each other, the sum of all surfaces of the working piston exposed to the pressure in the pressure space in the direction of the displacement member, is greater than the sum of all surfaces of the working piston in the opposite direction.

9. A hydraulic drive system, according to claim 3, in which the valve piston is adjusted in its axial position by an adjusting screw provided through a wall of said pressure chamber remote from said cover.

10. A hydraulic drive system, according to claim 1, and further comprising return pistons guided laterally and outside the pressure space in separate hydraulic spaces.

11. A hydraulic drive system, according to claim 1, in which the end surface of the valve piston is surrounded by a rim protruding axially over the surface into which rim the sealing means on the working piston can be brought in a sealing fashion.

12. A hydraulic drive system, according to claim 11, in which the sealing means of the working piston are arranged on the circumferential surface of the working piston and cooperate with the inner surface of the axially protruding rim on the valve piston.

13. A hydraulic drive system, according to claim 3, in which the stop pin and the valve piston connected therewith are guided between two stops in the wall lying opposite the cover of the pressure space.

14. A hydraulic drive system, according to claim 1, in which the valve space is controllably connected with the space of lower pressure by means of a mechanically controlled solenoid valve.

15. A hydraulic drive system, according to claim 1, in which throttle openings are associated with the sealing means in order to delay the working piston before abutting the valve piston.